(12) United States Patent
Uto et al.

(10) Patent No.: US 12,196,119 B2
(45) Date of Patent: Jan. 14, 2025

(54) CO2 SEPARATION APPARATUS FOR INTERNAL COMBUSTION ENGINE

(71) Applicant: HONDA MOTOR CO., LTD., Tokyo (JP)

(72) Inventors: Hajime Uto, Saitama-ken (JP); Takuya Mito, Saitama-ken (JP); Shumon Hoshino, Saitama-ken (JP); Osami Yamamoto, Saitama-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 193 days.

(21) Appl. No.: 18/098,371

(22) Filed: Jan. 18, 2023

(65) Prior Publication Data

US 2023/0258112 A1 Aug. 17, 2023

(30) Foreign Application Priority Data

Feb. 15, 2022 (JP) .................. 2022-021524

(51) Int. Cl.
*F01N 3/08* (2006.01)
(52) U.S. Cl.
CPC ........ *F01N 3/0857* (2013.01); *F01N 2240/02* (2013.01); *F01N 2340/00* (2013.01)
(58) Field of Classification Search
CPC ............. F01N 2240/02; F01N 2340/00; F01N 3/0857; Y02C 20/40
See application file for complete search history.

(56) References Cited

U.S. PATENT DOCUMENTS

2014/0338394 A1* 11/2014 Oohashi ............. B01D 53/1475
                                                                                     62/617
2017/0306825 A1  10/2017  Kaneeda
2020/0016535 A1*  1/2020  Dakhil ................... B01D 53/62

FOREIGN PATENT DOCUMENTS

WO       2016/076041 A1    5/2016

* cited by examiner

*Primary Examiner* — Anthony Ayala Delgado
(74) *Attorney, Agent, or Firm* — Carter, DeLuca & Farrell LLP (57) ABSTRACT

Included are: a CO2 adsorber 7 including a plurality of adsorption passages 71 allowing exhaust gas to flow through and an adsorbent, on its wall surface, capable of adsorbing and desorbing CO2 depending on a temperature, and a heat exchanger 6 including a plurality of heat exchange passages 61 allowing the exhaust gas to flow through, being disposed in contact with the CO2 adsorber 7, and, when the exhaust gas flows through the heat exchange passages 61, transferring the heat to the CO2 adsorber 7 for heating it while removing the heat of the exhaust gas. The numbers of adsorption cells 72 and heat exchange cells 62 per unit area in a transverse section C are each set to a predetermined number and/or the sizes of the adsorption cell 72 and the heat exchange cell 62 in the transverse section C are each set to a predetermined size.

6 Claims, 8 Drawing Sheets

CO2 SEPARATION APPARATUS FOR INTERNAL COMBUSTION ENGINE

BACKGROUND

Technical Field

The present invention relates to a $CO_2$ separation apparatus for an internal combustion engine to be disposed in an exhaust system of the internal combustion engine mounted on a vehicle and to separate $CO_2$ from exhaust gas that has been discharged from the internal combustion engine.

Related Art $CO_2$ (carbon dioxide) contained in exhaust gas from an internal combustion engine mounted on an automobile or the like is said to be a cause of global warming, and there is a demand for separating and recovering $CO_2$ from the exhaust gas to reduce the amount of $CO_2$ discharged into the atmosphere.

As a $CO_2$ separation apparatus for separating $CO_2$ from the exhaust gas, for example, an apparatus described in WO 2016/076041 A has been conventionally known. In such a $CO_2$ separation apparatus, a $CO_2$ capture material for capturing $CO_2$ is installed in an exhaust passage of the internal combustion engine, $CO_2$ in the exhaust gas from the internal combustion engine is captured by the $CO_2$ capture material, and the captured $CO_2$ is desorbed from the $CO_2$ capture material.

Specifically, the exhaust passage includes two branch passages, to only one of which the exhaust gas is enabled to flow through by a switching valve, and the $CO_2$ capture materials are respectively disposed in both branch passages. By causing the exhaust gas to flow to one of the branch passages, $CO_2$ in the exhaust gas is captured by the $CO_2$ capture material of the branch passage (capturing step), and by heating the $CO_2$ capture material of the other one of the branch passages by use of the heat of the exhaust gas, $CO_2$ that is captured by the $CO_2$ capture material is desorbed (desorbing step). Then, in each $CO_2$ capture material, by alternately repeating the capturing step and the desorbing step, $CO_2$ is separated from the exhaust gas.

SUMMARY

In the above $CO_2$ separation apparatus, in desorbing $CO_2$ from the $CO_2$ capture material, the exhaust gas from the internal combustion engine is partially taken out, and the heat of the exhaust gas that has been taken out is given to the $CO_2$ capture material via a heat medium to raise the temperature of the $CO_2$ capture material. In such a manner, $CO_2$ that is captured by the $CO_2$ capture material is desorbed.

In the above $CO_2$ separation apparatus, however, in raising the temperature of the $CO_2$ capture material, a sufficient amount of heat of the exhaust gas cannot be given to the $CO_2$ capture material, and it may take time to raise the temperature of the $CO_2$ capture material. In such a case, it will take time to desorb $CO_2$ from the $CO_2$ capture material. In addition, WO 2016/076041 A described above only mentions that the heat of the exhaust gas is given to the $CO_2$ capture material via the heat medium in order to raise the temperature of the $CO_2$ capture material, and does not disclose a specific method for supplying the heat to the $CO_2$ capture material. Furthermore, vehicles equipped with internal combustion engines include a wide variety of exhaust systems depending on the vehicle type or the like. Hence, it is desirable that the $CO_2$ separation apparatus installed in the exhaust system is capable of flexibly handling requirements, restrictions, and the like of the exhaust system.

The present invention has been made to address the above issues, and has an object to provide a $CO_2$ separation apparatus for an internal combustion engine capable of efficiently desorbing $CO_2$ that has been adsorbed by a $CO_2$ adsorber and flexibly handling requirements, restrictions, and the like of an exhaust system to be installed.

In order to address the above issue, a first aspect relates to a $CO_2$ separation apparatus 2 for an internal combustion engine 3 to be disposed in an exhaust system (an exhaust passage 4, a first exhaust passage 4a, and a second exhaust passage 4b in an embodiment (hereinafter, the same applies to the present paragraph)) of the internal combustion engine and to separate $CO_2$ from exhaust gas that has been discharged from the internal combustion engine, the $CO_2$ separation apparatus including: a $CO_2$ adsorber 7 including a plurality of adsorption passages 71 and a predetermined adsorbent, the plurality of adsorption passages extending in parallel with each other and in a first predetermined direction and allowing the exhaust gas to flow through, the predetermined adsorbent being disposed on a wall surface of the adsorption passage and being capable of adsorbing and desorbing $CO_2$ depending on a temperature; and a heat exchanger 6 including a plurality of heat exchange passages 61 extending in parallel with each other and in a second predetermined direction and allowing the exhaust gas to flow through, being disposed in contact with the $CO_2$ adsorber, and, when the exhaust gas flows through the heat exchange passages, transferring the heat to the $CO_2$ adsorber while removing heat of the exhaust gas, thereby heating the $CO_2$ adsorber, in which in a transverse section C of the plurality of adsorption passages in the $CO_2$ adsorber and in a transverse section C of the plurality of heat exchange passages in the heat exchanger, in a case where an opening of each of the plurality of adsorption passages and an opening of each of the plurality of heat exchange passages are respectively defined as an adsorption cell 72 and a heat exchange cell 62, numbers of the adsorption cells and the heat exchange cells per unit area in the transverse sections are each set to a predetermined number, and/or sizes of the adsorption cell and the heat exchange cell in the transverse sections are each set to a predetermined size.

According to this configuration, the $CO_2$ separation apparatus includes the $CO_2$ adsorber and the heat exchanger, and the heat exchanger is disposed in contact with the $CO_2$ adsorber. The $CO_2$ adsorber includes a plurality of adsorption passages extending in parallel with each other and in a first predetermined direction and allowing the exhaust gas to flow through, and an adsorbent capable of adsorbing and desorbing $CO_2$ depending on a temperature is disposed on a wall surface of each adsorption passage. As such an adsorbent, for example, it is possible to use zeolite or the like that adsorbs $CO_2$ in a predetermined low-temperature range of relatively low temperatures and that desorbs $CO_2$ in a predetermined high-temperature range higher than the low-temperature range. Therefore, when the adsorbent is in the low-temperature range, the exhaust gas that has been discharged from the internal combustion engine flows into the adsorption passage, and thus $CO_2$ in the exhaust gas is adsorbed by the adsorbent in the adsorption passage.

On the other hand, the heat exchanger includes a plurality of heat exchange passages extending in parallel with each other and in the second predetermined direction and allowing the exhaust gas to flow through. When the exhaust gas that has been discharged from the internal combustion engine flows into each heat exchange passage, the heat exchanger, while removing the heat of the exhaust gas, transfers the heat to the CO2 adsorber, and thus heats the CO2 adsorber. As described above, the heat exchanger heats the CO2 adsorber, the temperature of the adsorbent in the CO2 adsorber rises, and CO2 is desorbed from the adsorbent in the CO2 adsorber, when the temperature falls within a high-temperature range.

As described above, by causing the high-temperature exhaust gas that has been discharged from the internal combustion engine to flow through the plurality of heat exchange passages of the heat exchanger, the CO2 adsorber can be heated by use of the heat of the exhaust gas, and CO2 that is adsorbed in the CO2 adsorber can be efficiently desorbed.

In addition, in the transverse section of the plurality of adsorption passages in the CO2 adsorber and in the transverse section of the plurality of heat exchange passages in the heat exchanger, in a case where the opening of each adsorption passage is an adsorption cell and the opening of each heat exchange passage is a heat exchange cell, the adsorption cell and the heat exchange cell are set as follows. That is, the number of the adsorption cells and the number of the heat exchange cells per unit area in the transverse sections are each set to a predetermined number, and/or the size of the adsorption cell and the size of the heat exchange cell in the transverse sections are each set to a predetermined size.

As described above, there are a wide variety of exhaust systems in a vehicle equipped with an internal combustion engine. Therefore, it is preferable that the CO2 separation apparatus to be installed in the exhaust system is capable of flexibly handling requirements, restrictions, and the like of the exhaust system to be installed. Therefore, in the adsorption cells of the CO2 adsorber and the heat exchange cells of the heat exchanger, the number and size per unit area are set in accordance with the requirements and restrictions of the exhaust system, and thus a CO2 separation apparatus including a CO2 separation function suitable for the exhaust system to be installed and being capable of achieving an appropriate layout is obtainable.

In a second aspect, in the CO2 separation apparatus for the internal combustion engine according to the first aspect, the number of the adsorption cells per unit area in the transverse section is set to be larger than the number of the heat exchange cells.

According to this configuration, by setting the number of the adsorption cells per unit area in the above transverse section to be larger than the number of the heat exchange cells, the total area of the wall surface of the adsorption passage can be made larger than that of a case where the number of the adsorption cells is set to be equal to that of the heat exchange cells. Accordingly, for the exhaust gas to flow into the CO2 adsorber, the wall surface of the adsorption passage in contact with the exhaust gas can be enlarged, and CO2 can be efficiently adsorbed.

In a third aspect, in the CO2 separation apparatus for the internal combustion engine according to the first or second aspect, the size of the adsorption cell in the transverse section is set to be smaller than the size of the heat exchange cell.

According to this configuration, by setting the size of the adsorption cell in the above transverse section to be smaller than the size of the heat exchange cell, the number of adsorption cells per unit area can be increased as compared with that of a case where the size of the adsorption cell is set to be equal to that of the heat exchange cell. Accordingly, as in the second aspect described above, the total area of the wall surface of the adsorption passage can be increased, so that the wall surface of the adsorption passage with which the exhaust gas is in contact can be enlarged, and CO2 can be efficiently adsorbed.

In a fourth aspect, in the CO2 separation apparatus for the internal combustion engine according to one of the first to third aspects, the CO2 adsorber includes a first molded body having a honeycomb structure including the plurality of adsorption passages, and the heat exchanger has a honeycomb structure including the plurality of heat exchange passages, and includes a second molded body different from the first molded body.

According to this configuration, the CO2 adsorber includes the first molded body having a honeycomb structure including the plurality of adsorption passages. On the other hand, the heat exchanger has a honeycomb structure including a plurality of heat exchange passages, and includes a second molded body different from the first molded body of the CO2 adsorber. In this manner, the CO2 adsorber and the heat exchanger includes molded bodies different from each other, and thus it is possible to obtain an adsorption cell, a heat exchange cell, and a CO2 separation apparatus having an entire outer shape and size in accordance with requirements, restrictions, and the like of an exhaust system to be installed.

In a fifth aspect, in the CO2 separation apparatus for the internal combustion engine according to the fourth aspect, the first molded body entirely includes the adsorbent.

According to this configuration, the entire first molded body constituting the CO2 adsorber is made up of the adsorbent, and thus it is possible to make the heat capacity of the first molded body itself relatively small. Accordingly, in adsorbing and desorbing CO2, control of raising and lowering the temperature of the CO2 adsorber can be conducted in a relatively easy manner. In addition, in producing the CO2 adsorber, a process of providing the adsorbent on the wall surface of each adsorption passage of the first molded body can be omitted, and the production efficiency can be increased accordingly.

In a sixth aspect, in the CO2 separation apparatus for the internal combustion engine according to one of the first to fifth aspects, the first predetermined direction and the second predetermined direction are different from each other.

According to this configuration, the first predetermined direction and the second predetermined direction are different from each other, and thus the extending direction of each adsorption passage of the CO2 adsorber and the extending direction of each heat exchange passage of the heat exchanger are different from each other. Accordingly, the direction of flowing through the CO2 adsorber and the direction of flowing through the heat exchanger are different from each other. Therefore, in an exhaust system of the internal combustion engine in which the CO2 separation apparatus is installed, even though the direction of the exhaust gas that flows to the CO2 adsorber and the direction of the exhaust gas that flows to the heat exchanger are different from each other, the CO2 separation apparatus can be appropriately installed in such an exhaust system.

DETAILED DESCRIPTION

Figure 1:
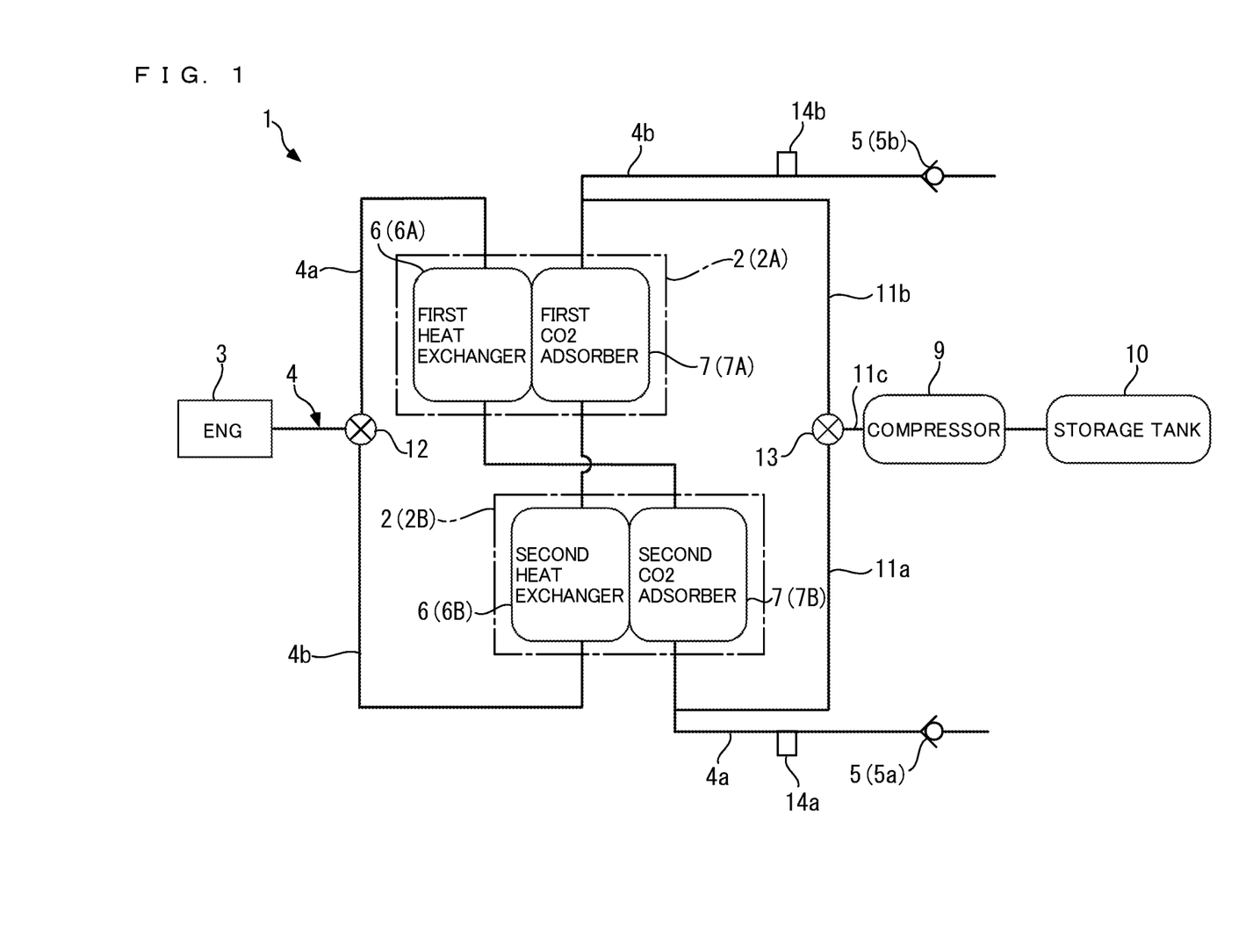
FIG. 1 is a diagram schematically illustrating a CO2 separation and recovery system in which a CO2 separation apparatus according to an embodiment of the present invention is applied to an exhaust system of an internal combustion engine.

Hereinafter, preferred embodiments of the present invention will be described in detail with reference to the drawings. FIG. 1 schematically illustrates a CO2 separation and recovery system 1, in which a CO2 separation apparatus 2 according to an embodiment of the present invention is installed in an exhaust system of an internal combustion engine 3, together with the internal combustion engine 3.

The internal combustion engine 3 (hereinafter, referred to as "engine") is mounted as a power source on, for example, a vehicle (not illustrated), and is a gasoline engine including, for example, four cylinders (not illustrated). In the engine 3, an intake passage (not illustrated) and an exhaust passage 4 are connected with each cylinder via a manifold (not illustrated). In addition, in the engine 3, in each cylinder, an air-fuel mixture of fuel that has been injected from a fuel injection valve (not illustrated) and air that has been sucked from an intake passage is combusted by ignition of an ignition plug (not illustrated), and high-temperature combustion gas that has been generated accordingly is discharged as exhaust gas to the exhaust passage 4. Note that a one-way valve 5 is disposed on a downstream end side of the exhaust passage 4.

As illustrated in FIG. 1, the CO2 separation and recovery system 1 is for separating and recovering CO2 (carbon dioxide) from the exhaust gas that flows through the exhaust passage 4, and includes two CO2 separation apparatuses 2A and 2B, a compressor 9, and a storage tank 10. The exhaust passage 4 is configured to branch into a first exhaust passage 4a and a second exhaust passage 4b via a first switching valve 12 on an upstream side. In addition, two CO2 separation apparatuses, which are a first CO2 separation apparatus 2A and a second CO2 separation apparatus 2B, are respectively disposed to straddle the first and second exhaust passages 4a and 4b.

Each CO2 separation apparatus 2 includes a heat exchanger 6 and a CO2 adsorber 7, which are adjacent to each other while being in contact with each other. Note that in the following description, in a case of distinguishing between the heat exchanger 6 and the CO2 adsorber 7 of each CO2 separation apparatus 2, the heat exchanger 6 and the CO2 adsorber 7 of the first CO2 separation apparatus 2A will be respectively referred to as a first heat exchanger 6A and a first CO2 adsorber 7A, and the heat exchanger 6 and the CO2 adsorber 7 of the second CO2 separation apparatus 2B will be respectively referred to as a second heat exchanger 6B and a second CO2 adsorber 7B.

In the above first exhaust passage 4a, the first heat exchanger 6A and the second CO2 adsorber 7B are disposed sequentially from an upstream side. On the other hand, in the second exhaust passage 4b, the second heat exchanger 6B and the first CO2 adsorber 7A are disposed sequentially from the upstream side.

Figure 2A:
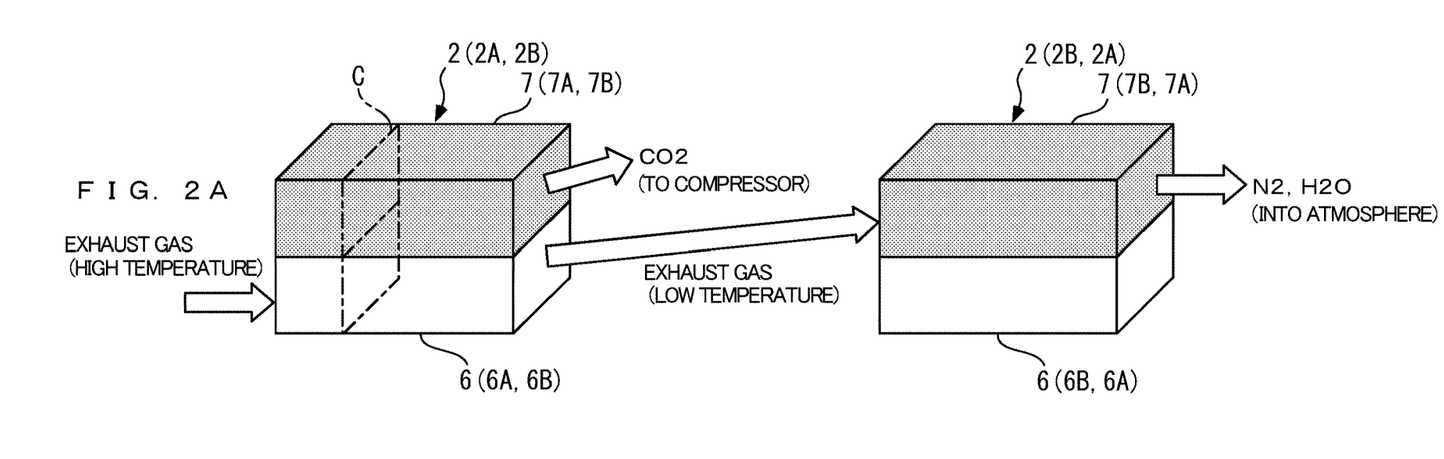
FIG. 2A is an explanatory view for describing desorption of CO2 in the CO2 separation apparatus on an upstream side and adsorption of CO2 in the CO2 separation apparatus on a downstream side by use of two CO2 separation apparatuses.

Here, referring to FIG. 2A to FIG. 3D, the CO2 separation apparatus 2 will be described in detail. FIG. 2A schematically illustrates desorption and adsorption of CO2 by use of two CO2 separation apparatuses of the first CO2 separation apparatus 2A and the second CO2 separation apparatus 2B, which are configured to be identical to each other. In addition, FIGS. 2B and 2C each illustrate a cross-section C (transverse section) of the CO2 separation apparatus 2 in FIG. 2A, when viewed from an inflow side of the exhaust gas, and each illustrate an example of the CO2 adsorber 7, in which the number of adsorption cells 72 and the size of the adsorption cell 72 per unit area to be described later are different from each other. Furthermore, FIGS. 3A and 3B each illustrate the appearance of the CO2 separation apparatus 2 respectively corresponding to FIGS. 2B and 2C. As described above, the CO2 separation apparatus 2 includes the heat exchanger 6 and the CO2 adsorber 7, which are adjacent to each other.

The heat exchanger 6 is made of a predetermined material (for example, metal or ceramic), and is constituted by a molded body (a second molded body) having a honeycomb structure including a large number of heat exchange passages 61, which enable exhaust gas to flow through. The periphery of each heat exchange passage 61 is partitioned by a partition wall, and all the heat exchange passages 61 are configured to extend in parallel with each other in a predetermined direction (a second predetermined direction), specifically, along a front and back direction in FIGS. 2B and 2C and from the near side to the far side in FIGS. 3A and 3B by a predetermined length.

On the other hand, the CO2 adsorber 7 is made of a predetermined material (for example, metal or ceramic), and is constituted by a molded body (a first molded body) having a honeycomb structure including a large number of adsorption passages 71, which enable the exhaust gas to flow through. The periphery of each adsorption passage 71 is partitioned by a partition wall, and all the adsorption passages 71 are configured to extend in parallel with each other in a predetermined direction (a first predetermined direction) by a predetermined length in a similar manner to the heat exchange passage 61. In addition, in the CO2 adsorber 7, the wall surface of each adsorption passage 71 is coated with a predetermined adsorbent (for example, zeolite) capable of adsorbing and desorbing CO2 depending on the temperature.

Figure 4:
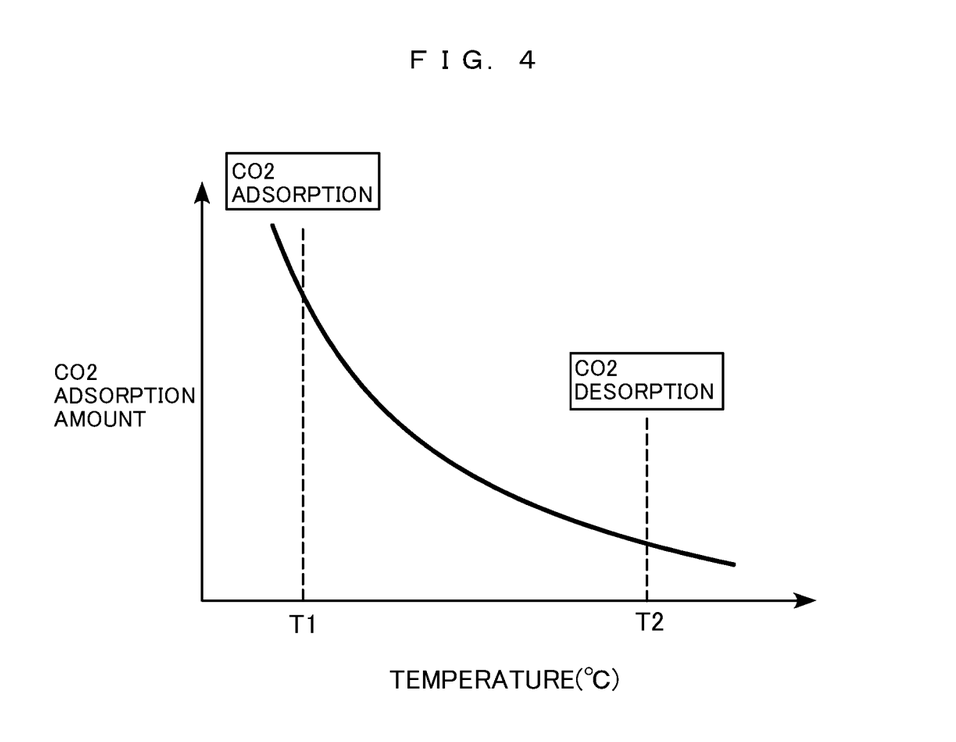
FIG. 4 is a graph illustrating temperature characteristics of CO2 adsorption performance of an adsorbent.

FIG. 4 illustrates temperature characteristics of $CO_2$ adsorption performance of the adsorbent. As illustrated in the drawing, the adsorption amount of $CO_2$ adsorbed by the adsorbent varies depending on the temperature of the adsorbent, and increases as the temperature is lowered, and decreases as the temperature rises. In addition, when the temperature of the adsorbent rises to be equal to or higher than a predetermined temperature, $CO_2$ is desorbed from the adsorbent. For example, $CO_2$ is favorably adsorbed to the adsorbent at a temperature T1 (for example, 50° C.) indicated in FIG. 4, and $CO_2$ is favorably desorbed from the adsorbent at a temperature T2 (for example, 250° C.) indicated in FIG. 4.

By utilizing such temperature characteristics of the adsorbent, in the $CO_2$ separation and recovery system 1, $CO_2$ is desorbed and adsorbed by use of the two $CO_2$ separation apparatuses 2A and 2B. That is to say, as illustrated in FIG. 2A, when high-temperature exhaust gas is introduced into the heat exchanger 6 of one $CO_2$ separation apparatus 2, the heat of the exhaust gas is removed by the heat exchanger 6 and is transferred to the $CO_2$ adsorber 7. Accordingly, the $CO_2$ adsorber 7 is heated, the temperature of the adsorbent rises, and thus $CO_2$ that has been adsorbed by the adsorbent is desorbed and transferred to the compressor 9. In addition, the temperature of the exhaust gas that has been introduced into the heat exchanger 6 is lowered, and the exhaust gas is introduced into the $CO_2$ adsorber 7 of the other $CO_2$ separation apparatus 2. Accordingly, $CO_2$ in the exhaust gas that has been introduced is adsorbed by the adsorbent of the $CO_2$ adsorber 7, and exhaust gas from which $CO_2$ is removed or reduced, that is, $H_2O$ (water), $N_2$ (nitrogen), and the like are discharged into the atmosphere.

Note that in the following description, in a cross-section C of the $CO_2$ separation apparatus 2 illustrated in FIG. 2A, that is, in the transverse section C of the heat exchange passage 61 in the heat exchanger 6, and in the transverse section C of the adsorption passage 71 in the $CO_2$ adsorber 7, openings of each heat exchange passage 61 and each adsorption passage 71 will be respectively referred to as a heat exchange cell 62 and an adsorption cell 72.

In the $CO_2$ separation apparatuses 2A and 2B illustrated in FIGS. 2B and 2C and FIGS. 3A and 3B, the number of the adsorption cells 72 and the number of the heat exchange cells 62 per unit area in the transverse section C are each set to be a predetermined number, and the size of the adsorption cell 72 and the size of the heat exchange cell 62 are each set to be a predetermined size in accordance with requirements, restrictions, and the like of an exhaust system to be installed.

Figure 2B:
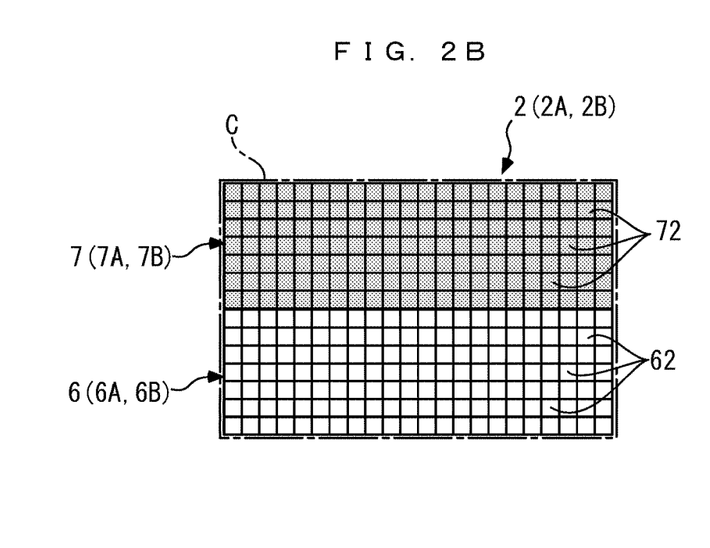
FIGS. 2B and 2C are diagrams illustrating a state as an example when a transverse section of the CO2 separation apparatus is viewed from an inflow side of exhaust gas.
Figure 3A:
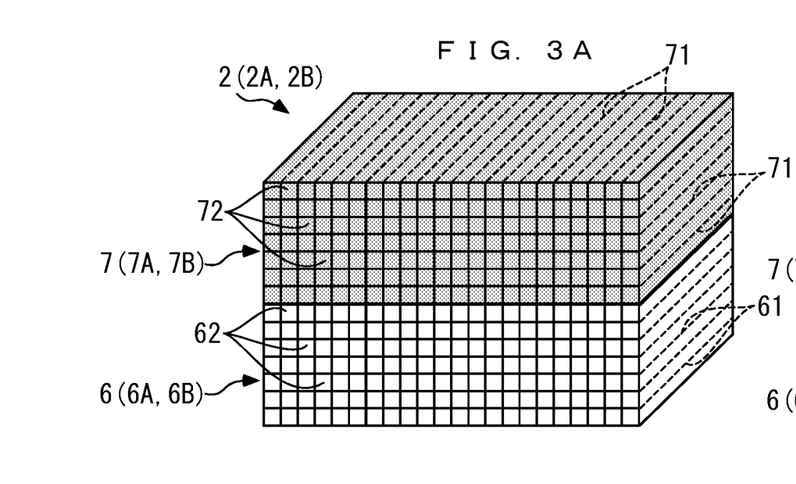
FIGS. 3A and 3B are diagrams schematically illustrating respective appearances of the CO2 separation apparatuses of FIGS. 2B and 2C.

Specifically, in the $CO_2$ separation apparatus 2 illustrated in FIGS. 2B and 3A, the number of the adsorption cells 72 and the number of the heat exchange cells 62 per unit area in the transverse section C are set to be equal to each other, and the size of the adsorption cells 72 and the size of the heat exchange cells 62 are set to be equal to each other.

Figure 2C:
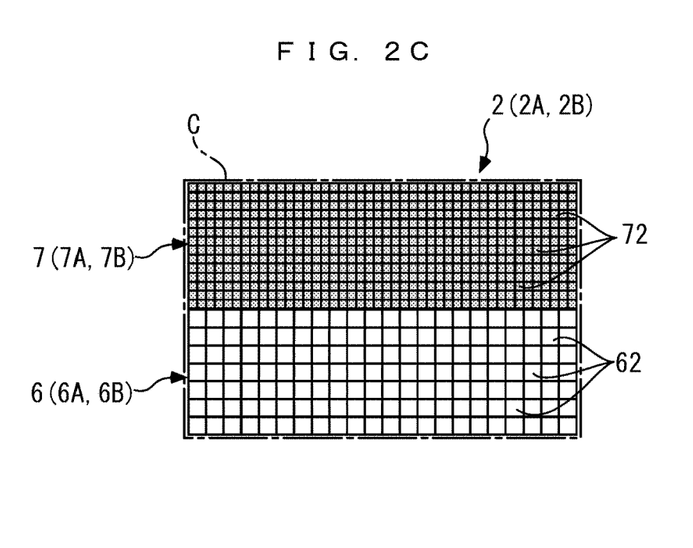
Figure 3B:
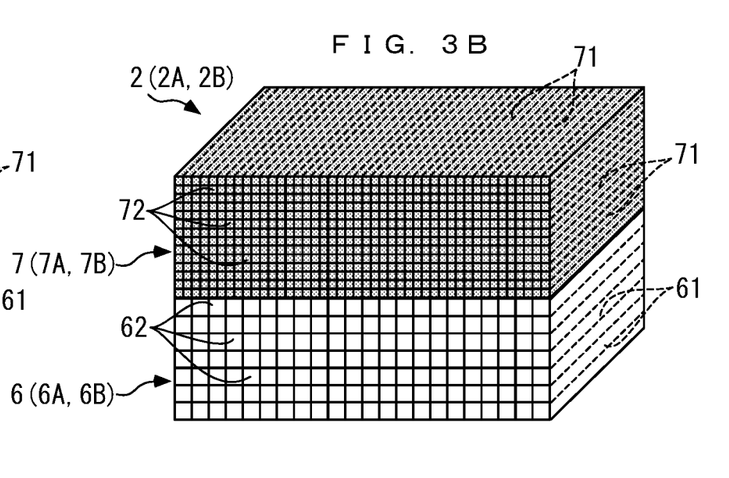

On the other hand, in the $CO_2$ separation apparatus 2 illustrated in FIGS. 2C and 3B, the number of the adsorption cells 72 per unit area in the transverse section C is set to be larger than the number of the heat exchange cells 62, and the size of each adsorption cell 72 is set to be smaller than the size of each heat exchange cell 62.

Figure 3C:
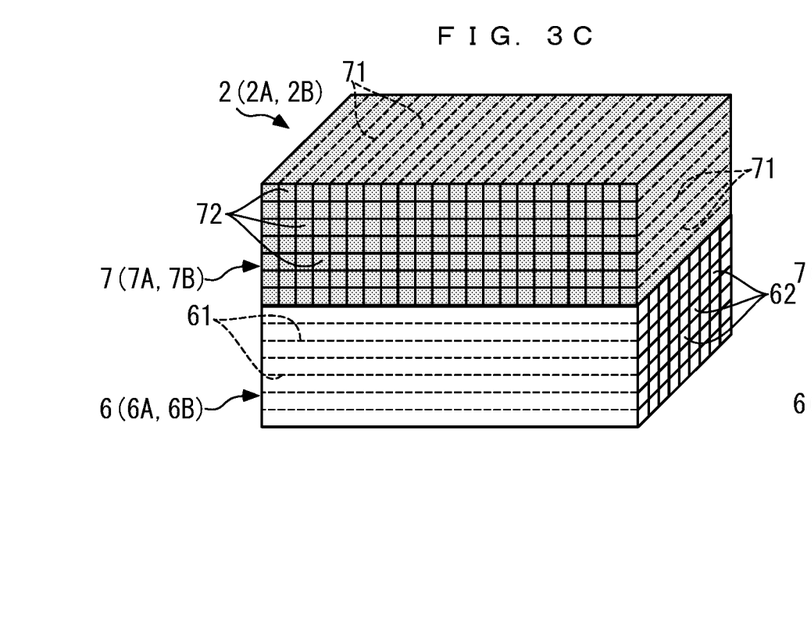
FIGS. 3C and 3D respectively illustrate states in which passages of the exhaust gas of a heat exchanger and a CO2 adsorber are set to extend in different directions from each other in the CO2 separation apparatuses of FIGS. 3A and 3B.
Figure 3D:
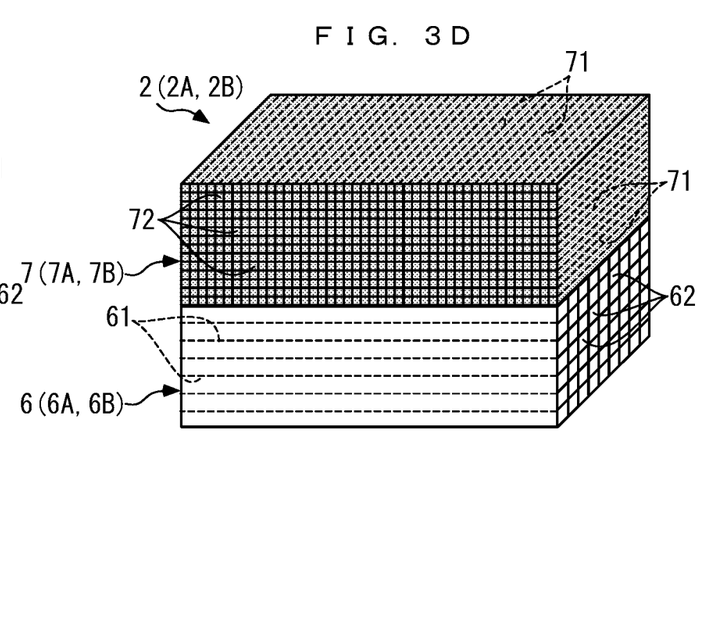

Further, as illustrated in FIGS. 3C and 3D, for example, it is possible to set the $CO_2$ separation apparatus 2 such that the heat exchange passage 61 of the heat exchanger 6 and the adsorption passage 71 of the $CO_2$ adsorber 7 are set to form a right angle, that is, the directions in which the passages 61 and 71 extend are different from each other.

Returning to FIG. 1, as illustrated in FIG. 1, in the first exhaust passage 4a, a first branch passage 11a branches on a downstream of the second $CO_2$ adsorber 7B of the second $CO_2$ separation apparatus 2B, whereas in the second exhaust passage 4b, a second branch passage 11b branches on a downstream of the first $CO_2$ adsorber 7A of the first $CO_2$ separation apparatus 2A. The first and second branch passages 11a and 11b merge together via a downstream-side switching valve 13, and the compressor 9 and the storage tank 10 are disposed sequentially from an upstream side in a merging passage 11c, which is connected with the downstream-side switching valve 13.

The compressor 9 is made up of, for example, an electric pump, and stores $CO_2$ that has flowed into the merging passage 11c in the storage tank 10, while compressing $CO_2$.

In addition, the first exhaust passage 4a is provided with a first $CO_2$ concentration sensor 14a on a downstream side of the second $CO_2$ adsorber 7B, and the second exhaust passage 4b is provided with a second $CO_2$ concentration sensor 14b on a downstream side of the first $CO_2$ adsorber 7A.

Figure 5:
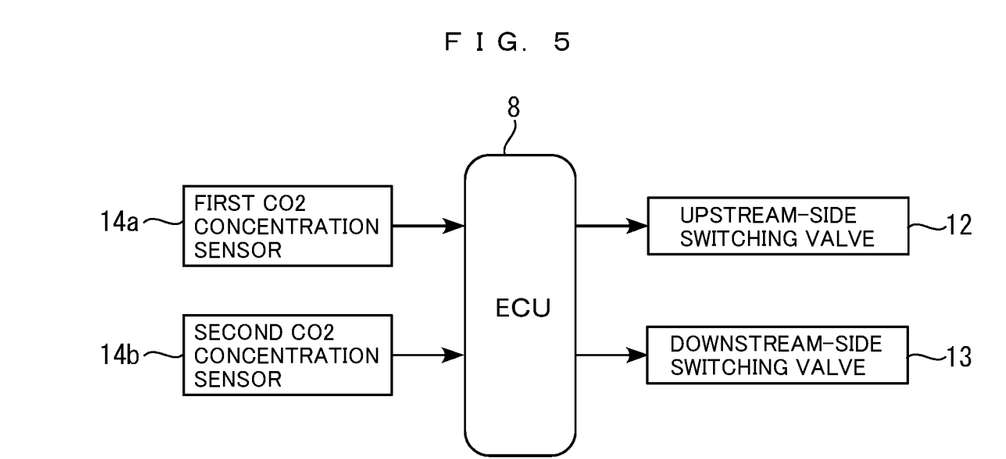
FIG. 5 is a block diagram illustrating a control device of a CO2 separation and recovery system.

FIG. 5 illustrates a control device of the $CO_2$ separation and recovery system 1. An ECU 8 illustrated in the drawing is configured with a microcomputer including a CPU, a RAM, a ROM, an I/O interface (none of which is illustrated), and the like. The ECU 8 controls the switching valves 12 and 13 on the upstream and downstream sides in accordance with detection signals of the first and second $CO_2$ concentration sensors 14a and 14b. Accordingly, one of the first and second $CO_2$ separation apparatuses 2A and 2B adsorbs $CO_2$ in the exhaust gas, and the other one of the first and second $CO_2$ separation apparatuses 2A and 2B desorbs $CO_2$ that is adsorbed.

Figure 6:
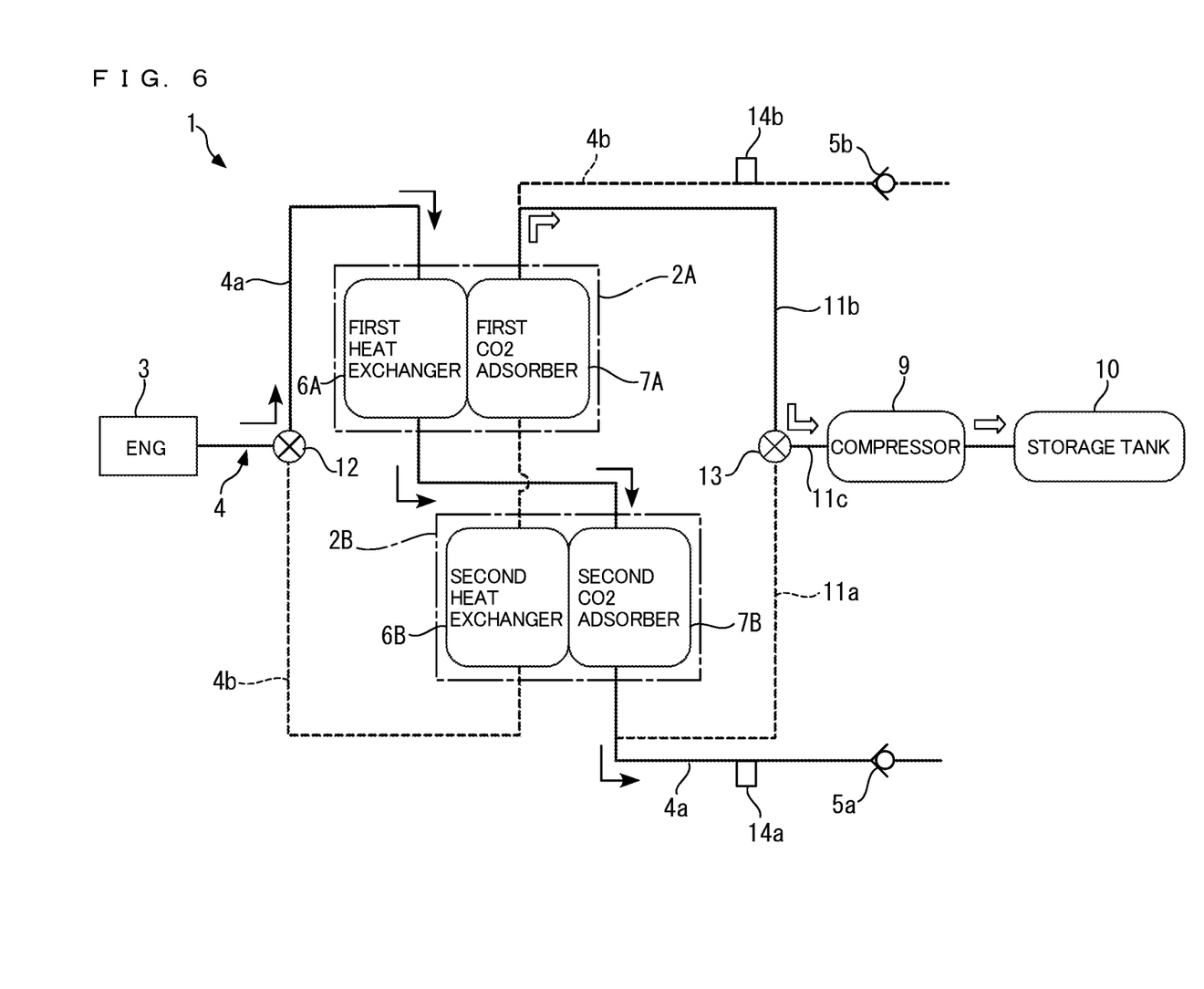
FIG. 6 is a diagram illustrating an operation of the CO2 separation and recovery system, and illustrates a state in which CO2 is desorbed in a first CO2 separation apparatus and CO2 is also adsorbed in a second CO2 separation apparatus.

Next, the operation of the $CO_2$ separation and recovery system 1 will be described with reference to FIGS. 6 and 7. FIG. 6 illustrates a state in which a $CO_2$ desorption process is performed in the first $CO_2$ separation apparatus 2A, and a $CO_2$ adsorption process is also performed in the second $CO_2$ separation apparatus 2B. In addition, in the drawing, the exhaust passage 4 is switched to the first exhaust passage 4a by the upstream-side switching valve 12, and the second branch passage 11b is switched to the merging passage 11c by the downstream-side switching valve 13.

First, the high-temperature exhaust gas that has been discharged from the engine 3 flows through the first exhaust passage 4a into the first heat exchanger 6A of the first $CO_2$ separation apparatus 2A, as indicated by an arrow. The heat of the exhaust gas is removed while the exhaust gas is passing through the first heat exchanger 6A, and its temperature is lowered. In this case, the first heat exchanger 6A heats the first $CO_2$ adsorber 7A with the heat that has been removed from the exhaust gas. Accordingly, the temperature of the adsorbent of the first $CO_2$ adsorber 7A rises, and $CO_2$ that has been adsorbed is desorbed. As indicated by an outlined arrow, such desorbed $CO_2$ passes through the second branch passage 11b, is compressed by the compressor 9, and is stored in the storage tank 10. In addition, low-temperature exhaust gas that has flowed out of the first heat exchanger 6A flows into the second $CO_2$ adsorber 7B of the second $CO_2$ separation apparatus 2B as indicated by an arrow, and $CO_2$ in the exhaust gas is adsorbed. Accordingly, the exhaust gas from which $CO_2$ has been removed or reduced flows out of the second $CO_2$ adsorber 7B, and is discharged through the first exhaust passage 4a and the first one-way valve 5a into the atmosphere.

Figure 8:
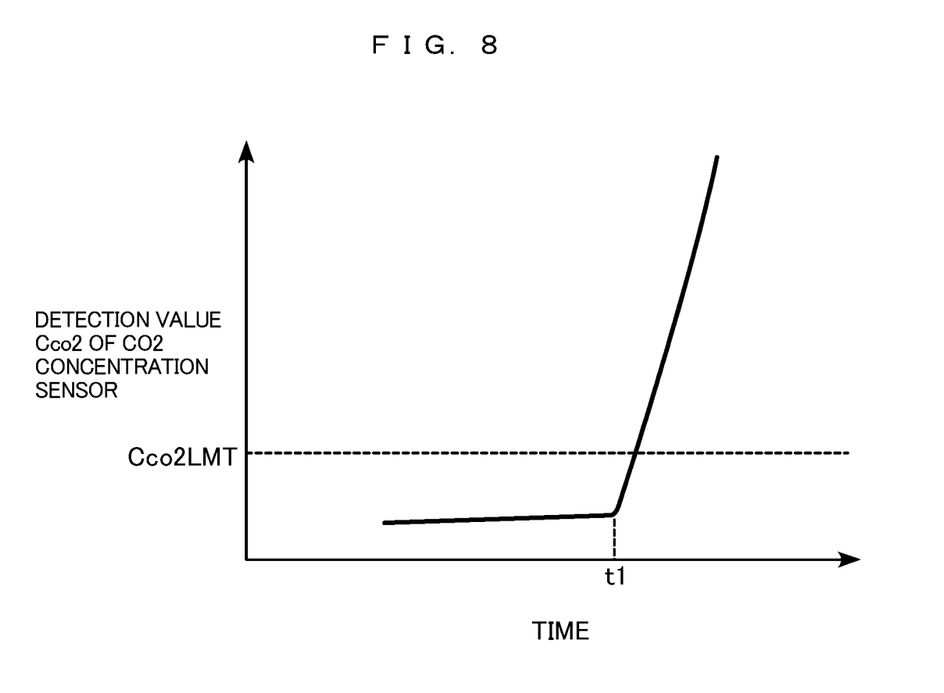
FIG. 8 is a graph illustrating transition of CO2 concentration in the exhaust gas that has passed through the CO2 adsorber.

FIG. 8 illustrates transition of a detection value Cco2 of the $CO_2$ concentration by the first and second $CO_2$ concentration sensors 14a and 14b. As described above, in a case where the exhaust gas flows through the first exhaust passage 4a, while CO2 in the exhaust gas is being adsorbed by the second CO2 adsorber 7B, the detection value Cco2 of the CO2 concentration is continuously kept relatively low (before time t1). Then, the adsorption of CO2 proceeds, and when the adsorption amount approaches or exceeds an allowable adsorption amount of the second CO2 adsorber 7B, CO2 that is not adsorbed by the second CO2 adsorber 7B increases in the exhaust gas, and thus the detection value Cco2 of the CO2 concentration rapidly increases (time t1 or later).

An upper limit value Cco2LMT is set as a threshold value for switching the upstream-side and downstream-side switching valves 12 and 13, based on the detection value Cco2 of the CO2 concentration that transitions as described above. When the detection value Cco2 by the first CO2 concentration sensor 14a exceeds the upper limit value Cco2LMT (Cco2>Cco2LMT), the upstream-side and downstream-side switching valves 12 and 13 are switched, because the adsorption amount of CO2 in the second CO2 adsorber 7B has reached the adsorption allowable amount. That is, the upstream-side switching valve 12 switches the exhaust passage 4 to the second exhaust passage 4b, and the downstream-side switching valve 13 switches the first branch passage 11a to the merging passage 11c.

Contrary to FIG. 6 described above, FIG. 7 illustrates a state in which the $CO_2$ adsorption process is performed in the first CO2 separation apparatus 2A, and the CO2 desorption process is also performed in the second CO2 separation apparatus 2B.

Figure 7:
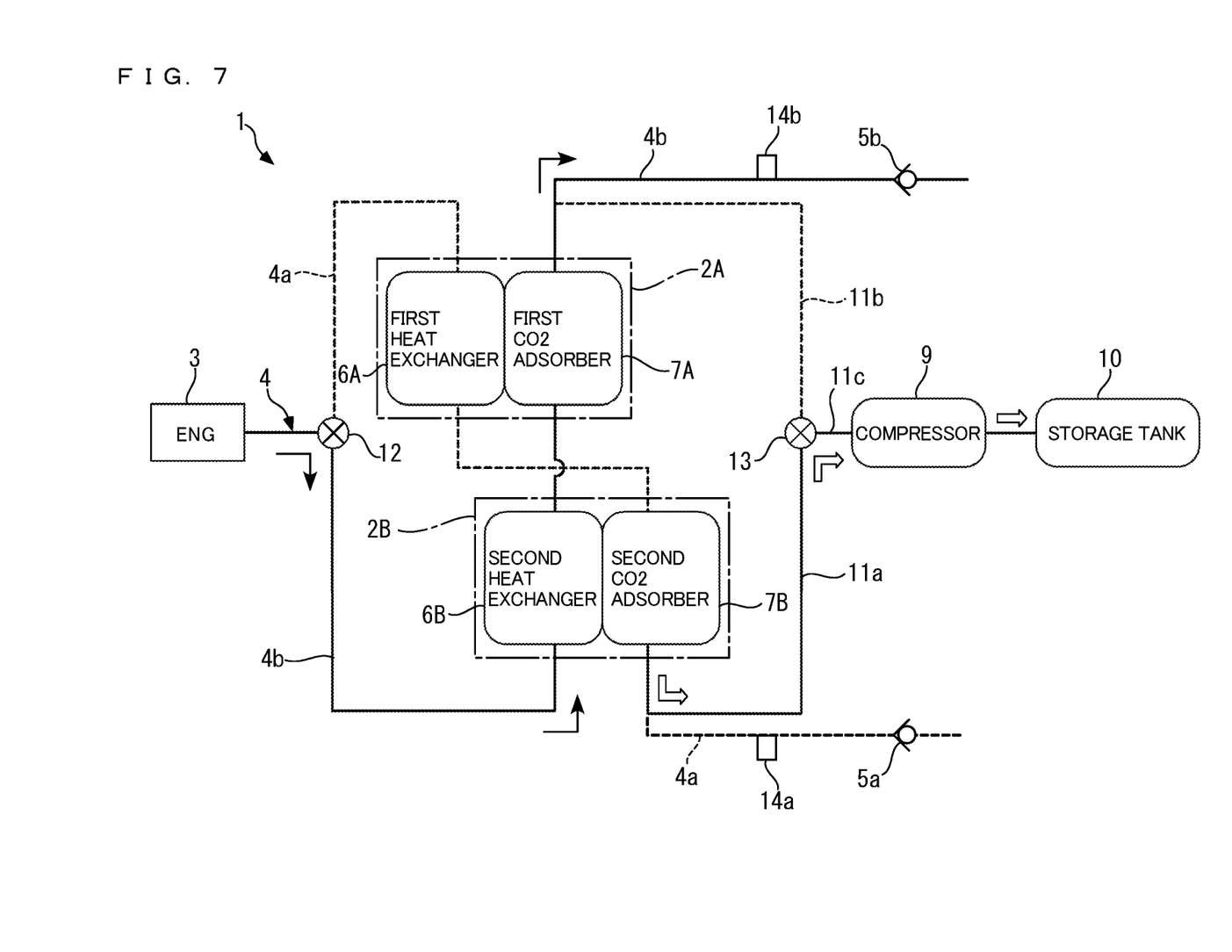
FIG. 7 is a diagram illustrating an operation of the CO2 separation and recovery system, and illustrates a state in which CO2 is adsorbed in the first CO2 separation apparatus and CO2 is also desorbed in the second CO2 separation apparatus.

As illustrated in FIG. 7, high-temperature exhaust gas that has been discharged from the engine 3 passes through the second exhaust passage 4b, flows sequentially into the second heat exchanger 6B of the second CO2 separation apparatus 2B and the first CO2 adsorber 7A of the first CO2 separation apparatus 2A as indicated by an arrow, and is discharged into the atmosphere via the second one-way valve 5b. In this case, in a similar manner to FIG. 6 described above, the heat of the exhaust gas is removed by the second heat exchanger 6B, and the second CO2 adsorber 7B is also heated by the removed heat. Accordingly, a temperature rise of the adsorbent of the second CO2 adsorber 7B desorbs CO2 that has been adsorbed, and such desorbed CO passes through the first branch passage 11a and the merging passage 11c as indicated by an outlined arrow, is compressed by the compressor 9, and is stored in the storage tank 10. In addition, the low-temperature exhaust gas that has flowed out of the second heat exchanger 6B flows into the first CO2 adsorber 7A of the first CO2 separation apparatus 2A, and CO2 in the exhaust gas is adsorbed. Further, the exhaust gas from which CO2 has been removed or reduced flows out of the first CO2 adsorber 7A, and is discharged through the second exhaust passage 4b and the second one-way valve 5b into the atmosphere.

Then, in a similar manner to the process based on the detection value Cco2 of the CO2 concentration by the first CO2 concentration sensor 14a described above, the upstream-side and downstream-side switching valves 12 and 13 are switched, based on the detection value Cco2 of the CO2 concentration by the second CO2 concentration sensor 14b, which is disposed on a downstream side of the first CO2 adsorber 7A in the second exhaust passage 4b.

As described heretofore, the CO2 separation and recovery system 1, which is mounted on the vehicle, alternately performs the adsorption process of CO2 in the exhaust gas and the desorption process of CO2 from the adsorber 7 between the first CO2 separation apparatus 2A and the second CO2 separation apparatus 2B. This greatly reduces discharging of CO2 in the exhaust gas discharged from the engine 3 into the atmosphere, while the vehicle is traveling.

Heretofore, as described in detail, according to the CO2 separation apparatus 2 in the present embodiment, high-temperature exhaust gas that has been discharged from the engine 3 is caused to flow through a large number of heat exchange passages 61 of the heat exchanger 6. Thus, the CO2 adsorber 7 is heated by use of the heat of the exhaust gas, and CO2 adsorbed in the CO2 adsorber 7 can be efficiently desorbed. In addition, in the adsorption cell 72 of the CO2 adsorber 7 and the heat exchange cell 62 of the heat exchanger 6, by setting the number and the size per unit area in accordance with requirements, restrictions, and the like of the exhaust system, it becomes possible to obtain the CO2 separation apparatus 2, which has a CO2 separation function suitable for the exhaust system to be installed, and which is capable of achieving an appropriate layout.

As illustrated in FIGS. 2C and 3B, by setting the number of the adsorption cells 72 per unit area in the transverse section C to be larger than that of the heat exchange cells 62 or by setting the size of the adsorption cell 72 to be smaller than that of the heat exchange cell 62, it is possible to increase the total area of the wall surface of the adsorption passage 71. Accordingly, while the exhaust gas is flowing into the CO2 adsorber 7, CO2 in the exhaust gas can be efficiently adsorbed.

Furthermore, in the CO2 separation apparatus 2, the extending direction of each adsorption passage 71 of the CO2 adsorber 7 and the extending direction of each heat exchange passage of the heat exchanger 6 can be set to be identical to each other (see FIGS. 3A and 3B) or different from each other (FIGS. 3C and 3D). Accordingly, in the exhaust system of the engine 3 in which the $CO_2$ separation apparatus 2 is installed, even though the direction of the exhaust gas flowing to the CO2 adsorber 7 and the direction of the exhaust gas flowing to the heat exchanger 6 are identical to or different from each other, the CO2 separation apparatus 2 can be appropriately installed in accordance with these exhaust systems.

Note that the present invention is not limited to the above embodiments that have been described, and can be carried out in various aspects. For example, in an embodiment, regarding the CO2 adsorber 7, a molded body having a honeycomb structure made of metal, ceramic, or the like is used, and its inner wall coated with an adsorbent is adopted. However, the present invention is not limited to this, and the molded body having a honeycomb structure may be made up of an adsorbent. In this case, it is possible to make the heat capacity of the molded body itself relatively small, and it is possible to conduct control of raising and lowering the temperature of the CO2 adsorber 7 at the time of adsorption and desorption of CO2 in a relatively easy manner. In addition, in the above case, in producing the CO2 adsorber 7, a process of coating the adsorbent on an inner wall of the molded body can be omitted, and the production efficiency can be increased accordingly.

In addition, in an embodiment, zeolite has been given as an example of the CO2 adsorbent. However, various type of adsorbents (for example, silica gel, lithium composite oxide, amine, or the like) are adoptable, as long as they can adsorb and desorb CO2 depending on the temperature.

Furthermore, in an embodiment, the shapes of the CO2 separation apparatus 2, the heat exchanger 6, and the CO2 adsorber 7 are each illustrated in a rectangular parallelepiped. However, the present invention is not limited to this, and various shapes (for example, a cylindrical shape) are adoptable in accordance with requirements, restrictions, and the like of an exhaust system to be installed. Additionally, the shapes of the heat exchange cell 62 and the adsorption cell 72 are each illustrated as a quadrangle. However, various shapes (for example, a hexagon) is also adoptable for these shapes.

Further, the detailed configurations of the CO2 separation apparatus 2, the heat exchanger 6, and the CO2 adsorber 7 that have been described in the embodiments are merely examples, and can be appropriately changed within the scope of the gist of the present invention.

What is claimed is:

1. A CO2 separation apparatus for an internal combustion engine to be disposed in an exhaust system of the internal combustion engine and to separate CO2 from exhaust gas that has been discharged from the internal combustion engine, the CO2 separation apparatus comprising:
    a CO2 adsorber including a plurality of adsorption passages and a predetermined adsorbent, the plurality of adsorption passages extending in parallel with each other and in a first predetermined direction and allowing the exhaust gas to flow through, the predetermined adsorbent being disposed on a wall surface of the adsorption passage and being capable of adsorbing and desorbing CO2 depending on a temperature; and
    a heat exchanger including a plurality of heat exchange passages extending in parallel with each other and in a second predetermined direction and allowing the exhaust gas to flow through, being disposed in contact with the CO2 adsorber, and, when the exhaust gas flows through the heat exchange passages, transferring the heat to the CO2 adsorber while removing heat of the exhaust gas, thereby heating the CO2 adsorber, wherein
    in a transverse section of the plurality of adsorption passages in the CO2 adsorber and in a transverse section of the plurality of heat exchange passages in the heat exchanger, in a case where an opening of each of the plurality of adsorption passages and an opening of each of the plurality of heat exchange passages are respectively defined as an adsorption cell and a heat exchange cell, numbers of the adsorption cells and the heat exchange cells per unit area in the transverse sections are each set to a predetermined number, and/or sizes of the adsorption cell and the heat exchange cell in the transverse sections are each set to a predetermined size.

2. The CO2 separation apparatus for the internal combustion engine according to claim 1, wherein the number of the adsorption cells per unit area in the transverse section is set to be larger than the number of the heat exchange cells.

3. The CO2 separation apparatus for the internal combustion engine according to claim 1, wherein the size of the adsorption cell in the transverse section is set to be smaller than the size of the heat exchange cell.

4. The CO2 separation apparatus for the internal combustion engine according to claim 1, wherein
    the CO2 adsorber includes a first molded body having a honeycomb structure including the plurality of adsorption passages, and
    the heat exchanger has a honeycomb structure including the plurality of heat exchange passages, and includes a second molded body different from the first molded body.

5. The CO2 separation apparatus for the internal combustion engine according to claim 4, wherein the first molded body entirely includes the adsorbent.

6. The CO2 separation apparatus for the internal combustion engine according to claim 1, wherein the first predetermined direction and the second predetermined direction are different from each other.

* * * * *